United States Patent
Nishimura

(10) Patent No.: US 12,535,790 B2
(45) Date of Patent: Jan. 27, 2026

(54) TIME DIFFERENCE SETTING DEVICE AND NUMERICAL CONTROL DEVICE

(71) Applicant: FANUC CORPORATION, Yamanashi (JP)

(72) Inventor: Ryuutarou Nishimura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 399 days.

(21) Appl. No.: 18/277,294

(22) PCT Filed: Apr. 20, 2021

(86) PCT No.: PCT/JP2021/015978
§ 371 (c)(1),
(2) Date: Aug. 15, 2023

(87) PCT Pub. No.: WO2022/224334
PCT Pub. Date: Oct. 27, 2022

(65) Prior Publication Data
US 2024/0126231 A1    Apr. 18, 2024

(51) Int. Cl.
G05B 19/402    (2006.01)
G05B 19/4093    (2006.01)

(52) U.S. Cl.
CPC ..... *G05B 19/402* (2013.01); *G05B 19/40937* (2013.01); *G05B 2219/36568* (2013.01); *G05B 2219/45165* (2013.01)

(58) Field of Classification Search
USPC ....................................................... 700/186
See application file for complete search history.

(56) References Cited

U.S. PATENT DOCUMENTS

| 2008/0223831 A1* | 9/2008 | Yoshikawa | B23K 26/0884 |
| | | | 219/121.64 |
| 2016/0249411 A1* | 8/2016 | Suzuki | B23K 37/0408 |
| 2019/0239330 A1* | 8/2019 | Niwano | H01S 3/2316 |

FOREIGN PATENT DOCUMENTS

| CN | 104203484 | 12/2014 |
| CN | 107966956 | 4/2018 |

(Continued)

OTHER PUBLICATIONS

JP_2009119500_A (Year: 2009).*

(Continued)

*Primary Examiner* — Hien D Khuu
(74) *Attorney, Agent, or Firm* — Wenderoth, Lind & Ponack, L.L.P.

(57) ABSTRACT

A time difference setting device is provided with: a speed change acquisition unit that acquires a change in speed of a driving mechanism with respect to a positioning command based on a machining program; a mechanism delay time calculation unit that calculates a mechanism delay time; a laser output calculation unit that uses an oscillator model for simulating the operation of a laser oscillator and calculates a change in output of the laser oscillator with respect to a laser command based on the machining program; a laser delay time calculation unit that calculates a laser delay time; and a command time difference setting unit that, on the basis of the mechanism delay time and the laser delay time, sets a command time difference for an interval in which an emission of laser light is designated in the machining program.

4 Claims, 2 Drawing Sheets

(56) References Cited

FOREIGN PATENT DOCUMENTS

| | | | |
|---|---|---|---|
| JP | S59206192 A | * | 11/1984 |
| JP | 7-15070 | | 7/1995 |
| JP | 2007-237202 | | 9/2007 |
| JP | 2016-155169 | | 9/2016 |
| WO | 00/53363 | | 9/2000 |
| WO | 2014/097451 | | 6/2014 |

OTHER PUBLICATIONS

JP_2016155169_A (Year: 2016).*
JP_2004167549_A (Year: 2004).*
JP_2687878_B2 (Year: 1997).*
International Search Report issued Jul. 6, 2021 in International (PCT) Application No. PCT/JP2021/015978.

* cited by examiner

TIME DIFFERENCE SETTING DEVICE AND NUMERICAL CONTROL DEVICE

TECHNICAL FIELD

The present invention relates to a time difference setting device and a numerical control device.

BACKGROUND ART

For a laser processing machine, it has been studied to reduce a deterioration in machining accuracy due to a delay in reflecting a command value that is output from a control device and designates a position of a drive shaft, an output of a laser, etc. in an actual output, for example. As a specific example, a technique has been proposed in which when a residual time of movement for a block, of a machining program, that is being executed reaches a switching time set based on a delay time of a drive shaft, a laser oscillator, etc., a laser command of the block being executed is switched to a laser command of the next block (for example, see Patent Document 1).

Patent Document 1: Japanese Unexamined Patent Application, Publication No. 2016-155169

DISCLOSURE OF THE INVENTION

Problems to be Solved by the Invention

The delay of the drive shaft and the laser oscillator is not always constant, and may change depending on types of machining and processing. Therefore, it is desirable to adjust a switching time of a laser according to a machining program in order to further improve machining accuracy. However, it is extremely troublesome to assume a time constant for each machining program and correct a setting value of the switching time. For this reason, there is a demand for a technique that can appropriately set a timing for changing a laser output.

Means for Solving the Problems

An aspect of the present disclosure provides a time difference setting device in a laser processing system including a laser oscillator that generates a laser beam, a laser head that emits the laser beam, a driving mechanism that determines a relative position of the laser head and a workpiece, and a numerical control device that generates, based on a machining program, a laser command for the laser oscillator and a positioning command for the driving mechanism. The time difference setting device is configured to set a command time difference which is a time difference in output timing of the laser command with respect to the positioning command, and includes: a speed change acquisition unit that acquires a change in speed of the driving mechanism with respect to the positioning command that is based on the machining program; a mechanism delay time calculation unit that calculates, based on the change in speed of the driving mechanism acquired by the speed change acquisition unit, a mechanism delay time which is a delay time in positioning by the driving mechanism with respect to the positioning command; a laser output calculation unit that calculates a change in output of the laser oscillator with respect to the laser command that is based on the machining program, using an oscillator model for simulating an operation of the laser oscillator; a laser delay time calculation unit that calculates, based on the change in output of the laser oscillator calculated by the laser output calculation unit, a laser delay time which is a delay time in output of the laser oscillator with respect to the laser command; and a command time difference setting unit that sets the command time difference for a section in which an emission of the laser beam is designated in the machining program, based on the mechanism delay time calculated by the mechanism delay time calculation unit and the laser delay time calculated by the laser delay time calculation unit.

Another aspect of the present disclosure provides a numerical control device in a laser processing system including a laser oscillator that generates a laser beam, a laser head that emits the laser beam, and a driving mechanism that determines a relative position of the laser head and a workpiece, the numerical control device being configured to generate, based on a machining program, a laser command for the laser oscillator and a positioning command for the driving mechanism. The numerical control device includes: a speed change acquisition unit that acquires a change in speed of the driving mechanism with respect to the positioning command that is based on the machining program; a mechanism delay time calculation unit that calculates, based on the change in speed of the driving mechanism acquired by the speed change acquisition unit, a mechanism delay time which is a delay time in positioning by the driving mechanism with respect to the positioning command; a laser output calculation unit that calculates a change in output of the laser oscillator with respect to the laser command that is based on the machining program, using an oscillator model for simulating an operation of the laser oscillator; a laser delay time calculation unit that calculates, based on the change in output of the laser oscillator calculated by the laser output calculation unit, a laser delay time which is a delay time in output of the laser oscillator with respect to the laser command; and a command time difference setting unit that sets a command time difference, which is a time difference in output timing of the laser command with respect to the positioning command, for a section in which an emission of the laser beam is designated in the machining program, based on the mechanism delay time calculated by the mechanism delay time calculation unit and the laser delay time calculated by the laser delay time calculation unit.

Effects of the Invention

The present disclosure can provide a time difference setting device and a numerical control device that can appropriately set a timing for switching a laser output.

PREFERRED MODE FOR CARRYING OUT THE INVENTION

Figure 1:
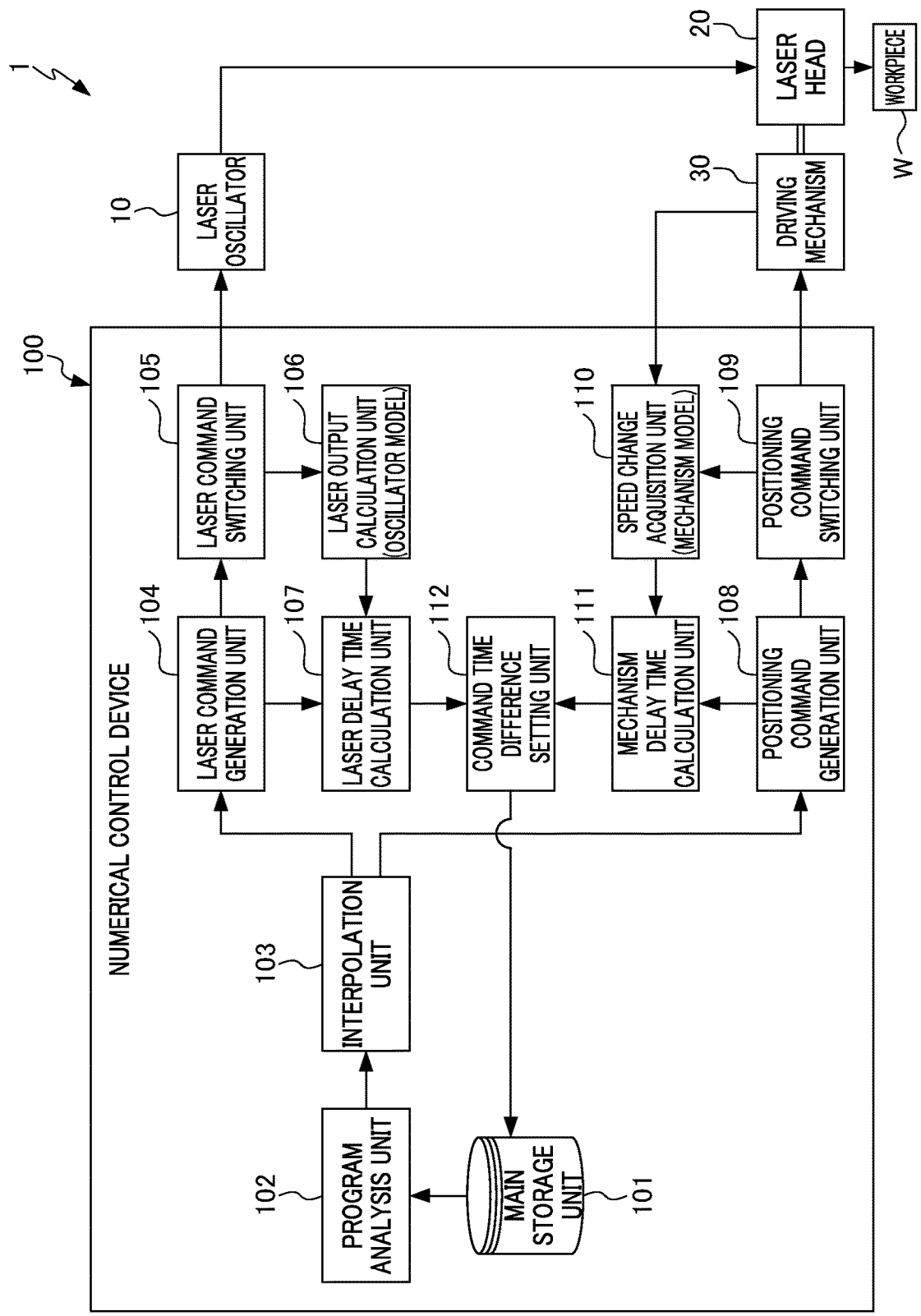
FIG. 1 is a block diagram showing a configuration of a laser processing system including a numerical control device according to an embodiment of the present disclosure.

An embodiment of the present disclosure will be described below with reference to the drawings. FIG. 1 is a block diagram showing a configuration of a laser processing system 1 including a numerical control device 100 according to an embodiment of the present disclosure.

The laser processing system 1 according to the present embodiment includes a laser oscillator 10 that generates a laser beam, a laser head 20 that emits the laser beam, a driving mechanism 30 that determines a relative position of the laser head 20 and a workpiece W, and a numerical control device 100 that controls, based on a machining program, the laser oscillator 10 and the driving mechanism 30. The laser processing system 1 is a system that performs processing on the workpiece W by irradiating with a laser.

The laser oscillator 10 generates a laser output in response to a laser command input from the numerical control device 100. As examples of the laser oscillator 10, an YAG laser oscillator, a carbon dioxide laser oscillator, and an excimer laser oscillator can be used.

The laser head 20 emits the laser generated by the laser oscillator 10 to irradiate the workpiece W with the laser. The laser head 20 has an optical system that focuses the laser on the workpiece W.

The driving mechanism 30 moves at least one of the laser head 20 and the workpiece W in response to a positioning command input from the numerical control device 100. As an example of the driving mechanism 30, a positioning mechanism such as a Cartesian coordinate robot, a vertical articulated robot, a SCARA robot, or a parallel link robot having a plurality of drive shafts can be used, or an actuator having only a single drive shaft may be used. Further, the driving mechanism 30 may also be configured to detect positions of the drive shafts and input a feedback signal to the numerical control device 100.

The numerical control device 100 generates a laser command for the laser oscillator 10 and a positioning command for the driving mechanism 30, based on the machining program. In addition, the numerical control device 100 sets a command time difference, which is a time difference between an output timing of the laser command and an output timing of the positioning command, in consideration of responsiveness of the laser oscillator 10 and the driving mechanism 30. The numerical control device 100 can be implemented by causing a computer device having a memory, a CPU, and an input/output interface to execute an appropriate control program, for example.

The numerical control device 100 includes a main storage unit 101, a program analysis unit 102, an interpolation unit 103, a laser command generation unit 104, a laser command switching unit 105, a laser output calculation unit 106, a laser delay time calculation unit 107, a positioning command generation unit 108, a positioning command switching unit 109, a speed change acquisition unit 110, a mechanism delay time calculation unit 111, and a command time difference setting unit 112. These components are classified according to function of the numerical control device 100, and may not be clearly distinguished in terms of a physical configuration and a program configuration.

The main storage unit 101 stores the machining program and the setting value of the command time difference. Further, the main storage unit 101 may further store parameters or codes specifying specifications of the laser oscillator 10 and the driving mechanism 30 and setting values defining processing methods in other components of the numerical control device 100.

The machining program is written in a language such as G code. Specifically, the machining program may include a plurality of command sentences for specifying designation coordinates through which the laser head 20 should pass, a moving speed and a curvature of a moving path, and the output of the laser oscillator 10.

The program analysis unit 102 analyzes the machining program, and converts it into a data format that can be processed by other components of the numerical control device 100.

The interpolation unit 103 calculates various control target values for each time according to the machining program. As a specific example, the control target values calculated by the interpolation unit 103 include a position or a speed of each drive shaft of the driving mechanism 30, and the output of the laser oscillator 10 at each time. A configuration of such an interpolation unit 103 is the same as that in a numerical control device for a conventional laser processing system.

The interpolation unit 103 may perform acceleration/deceleration processing to modify an operation designated by the machining program so as not to request a load exceeding a limit to the driving mechanism 30, that is, to suppress the acceleration of each drive shaft below an upper limit value. Such interpolation can also be performed in the same manner as in the conventional technique.

The laser command generation unit 104 generates a laser command signal, which is a signal for instructing the laser oscillator 10 based on the target value interpolated by the interpolation unit 103. A method of generating the laser command signal is the same as in the numerical control device for the conventional laser processing system. Normally, the value of the laser command changes stepwise according to the machining program. Further, the laser command generation unit 104 is configured to be able to delay a reference time of its output with respect to a reference time of output of the positioning command by a command time difference stored in the main storage unit 101.

The laser command switching unit 105 selects whether the laser command signal generated by the laser command generation unit 104 is input to the laser oscillator 10 or to the laser output calculation unit 106.

The laser output calculation unit 106 uses an oscillator model for simulating the operation of the laser oscillator 10 to calculate a change in output of the laser oscillator with respect to the laser command that is based on the machining program. Examples of the oscillator model can include a change delay of a start of laser output with respect to the laser command signal and a limit of rise and fall slopes of the laser output.

The laser delay time calculation unit 107 calculates a laser delay time, which is a delay time of the output of the laser oscillator 10 with respect to the laser command, based on the change in output of the laser oscillator 10 calculated by the laser output calculation unit 106. The laser delay time is calculated as a time from the moment when the value of the laser command changes stepwise until the value of the output calculated by the laser output calculation unit 106 becomes substantially equal to the value after the change in the laser command. Note that "substantially equal" can be determined as a state in which the difference between both the values is equal to or less than a preset threshold value considering that the simulation contains an error and the value is calculated only at certain time intervals.

In the machining program, the output of the laser can be changed several times. Therefore, the laser delay time calculation unit 107 may calculate the laser delay time as an average value in a working range divided according to the entire machining program or the content thereof.

The positioning command generation unit 108 generates a positioning command signal, which is a signal to instruct the driving mechanism 30 based on the target value interpolated by the interpolation unit 103. A plurality of positioning command signals can be generated corresponding to the plurality of drive shafts of the driving mechanism 30, respectively. A method of generating the positioning command is the same as in the numerical control device for the conventional laser processing system.

The positioning command switching unit 109 selects whether to input the positioning command signal generated by the positioning command generation unit 108 to the driving mechanism 30 or the speed change acquisition unit 110. In other words, the positioning command switching unit 109 selects whether to actually process the workpiece W or to set an optimal command time difference for the laser processing scheduled prior to the machining of the workpiece W.

The speed change acquisition unit 110 acquires a change in speed of the driving mechanism 30 with respect to the positioning command that is based on the machining program. Examples of a method of acquiring the change in speed of the driving mechanism 30 include a method of calculating the change in speed of the driving mechanism 30 with respect to the positioning command using a mechanism model that simulates the operation of the driving mechanism 30 and a method of obtaining the change in speed based on a feedback signal of the driving mechanism 30 by actually operating the driving mechanism 30 without irradiating with the laser. The speed change acquisition unit 110 of the present embodiment can be configured to calculate the change in speed of the driving mechanism 30 by simulation using the mechanism model and to confirm the change in speed of the driving mechanism 30 from the feedback signal of the driving mechanism 30.

The mechanism model of the speed change acquisition unit 110 can be a model that reproduces a mechanical play of the driving mechanism 30 and the deflection of members, based on a well-known technique. When the change in speed of the driving mechanism 30 is calculated using the mechanism model, it is possible to optimize the laser processing without damaging the laser head 20, the driving mechanism 30, or the workpiece W due to an improper operation. In addition, the mechanism model can also be used to compensate the operation of the driving mechanism 30 based on a well-known technique.

The mechanism delay time calculation unit 111 calculates a mechanism delay time, which is a delay time with respect to the positioning command for the driving mechanism 30, based on the change in speed of the driving mechanism 30 acquired by the speed change acquisition unit 110. The mechanism delay time is calculated as a time from the output of the positioning command until the speed of the driving mechanism 30 becomes substantially equal to the speed according to the positioning command.

The mechanism delay time calculation unit 111 may calculate times required for the speed of the driving mechanism 30 to become equal for all the positioning commands within a range in which the speed changes according to the positioning command, and calculate an average value thereof. In addition, the mechanism delay time calculation unit 111 may calculate the mechanism delay time only for the moment when the speed according to the positioning command becomes constant. Normally, the laser processing is performed while the speed of the driving mechanism 30 is kept constant. For this reason, when the mechanism delay time is calculated for the moment when the speed according to the positioning command becomes constant, the entire machining can be optimized easily and accurately.

The command time difference setting unit 112 sets a command time difference td, which is a time difference between the reference time of the laser command and the reference time of the positioning command, for a section in which an emission of the laser beam is designated in the machining program, based on a mechanism delay time t1 calculated by the mechanism delay time calculation unit 111 and a laser delay time t2 calculated by the laser delay time calculation unit 107. Specifically, the command time difference td is set to a value (t1−t2) obtained by subtracting the laser delay time t2 from the mechanism delay time t1, and thus the laser can be irradiated at a more faithful position by the machining program.

As described above, since the numerical control device 100 sets, based on the mechanism delay time t1 calculated by the mechanism delay time calculation unit 111 and the laser delay time t2 calculated accurately in the laser delay time calculation unit 107 by simulating the change in output of the laser oscillator 10 using the oscillator model in the laser output calculation unit 106, the command time difference td such that the machining program can be reproduced accurately in the command time difference setting unit 112, an operator can perform ideal laser processing without being conscious of differences in processing types. For example, when contour cutting is performed to cut out the workpiece W into a predetermined shape, the laser head 20 may be stopped at an end point of cutting, but the workpiece W can be prevented from being left uncut by setting the command time difference td in consideration of the mechanism delay time t1 indicating the delay in reaching the end point of the laser head 20 and the laser delay time t2 indicating the delay in stopping the output of the laser beam.

Figure 2:
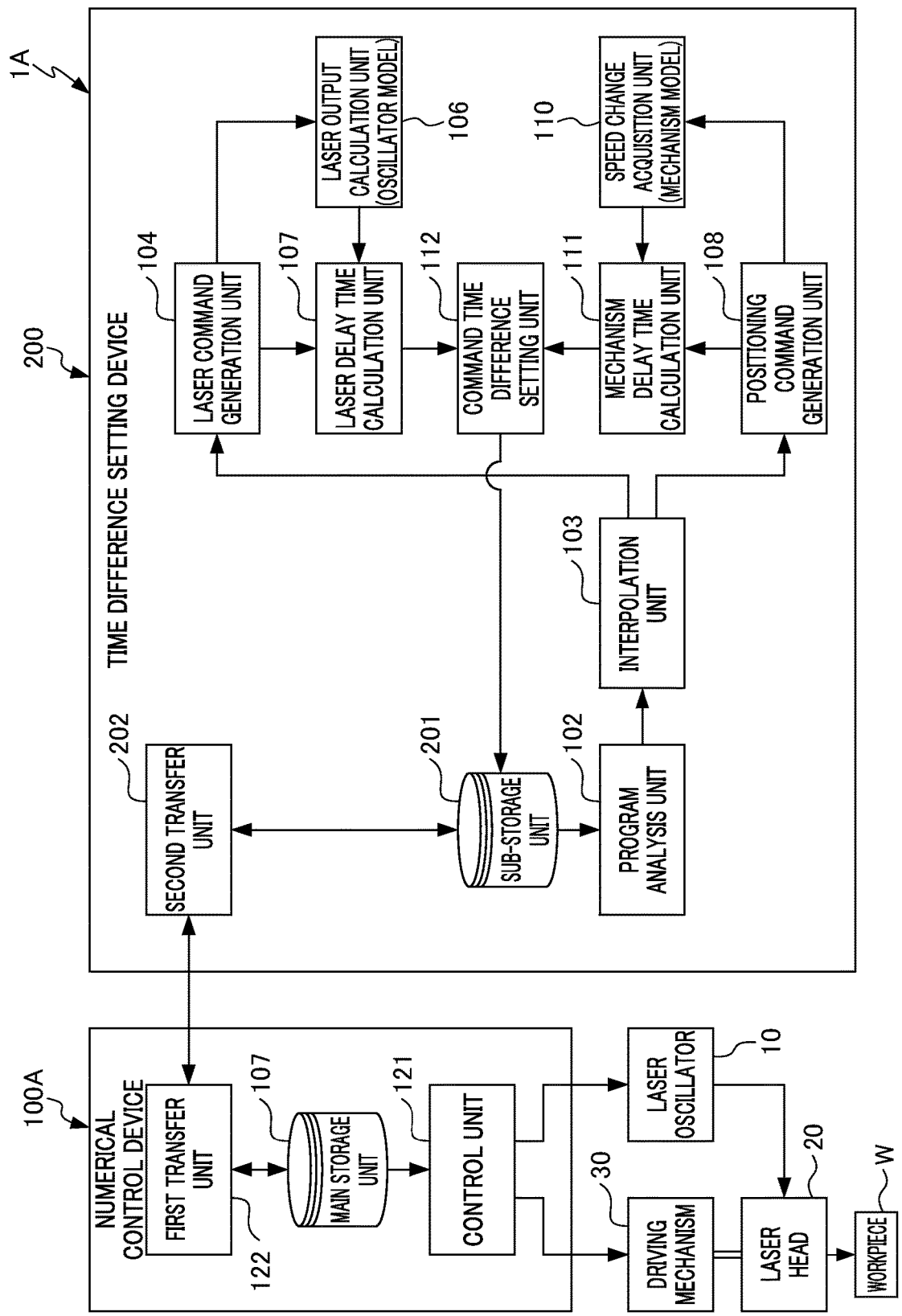
FIG. 2 is a block diagram showing a configuration of a laser processing system including a time difference setting device according to an embodiment of the present disclosure.

Subsequently, a time difference setting device according to the present disclosure will be described. FIG. 2 is a block diagram showing a configuration of a laser processing system 1A including a time difference setting device 200 according to an embodiment of the present disclosure. In the following description, the same components as in the embodiment described previously may be denoted by the same reference numerals, and will not be described repeatedly.

The laser processing system 1A according to the present embodiment includes a laser oscillator 10 that generates a laser beam, a laser head 20 that emits the laser beam, a driving mechanism 30 that determines a relative position of the laser head 20 and a workpiece W, a numerical control device 100A that controls, based on a machining program, the laser oscillator 10 and the driving mechanism 30, and a time difference setting device 200 that sets a command time difference.

The numerical control device 100A includes a main storage unit 101 that stores a machining program, a control unit 121 that generates, based on the machining program stored in the main storage unit 101, a laser command for the laser oscillator 10 and a positioning command for the driving mechanism 30, and a first transfer unit 122 that transmits and receives information to and from the time difference setting device 200.

Similarly to the numerical control device 100 of the laser processing system 1 in FIG. 1, the numerical control device 100A of the laser processing system 1A in FIG. 2 can also be implemented by causing a computer device to execute an appropriate control program.

The control unit 121 can have the same configuration as that of the numerical control device of the conventional laser processing system. As an example, the control unit 121 includes the program analysis unit 102, the interpolation unit 103, the laser command generation unit 104, and the positioning command generation unit 108 of the numerical control device 100 shown in FIG. 1.

The first transfer unit 122 transmits information stored in the main storage unit 101 to the time difference setting device 200, and causes the main storage unit 101 to store the information transmitted from the time difference setting device 200.

The time difference setting device 200 sets a command time difference between the laser command and the positioning command in the numerical control device 100A. The time difference setting device 200 can be implemented by causing a computer device having a memory, a CPU, and an input/output interface to execute an appropriate control program, for example. As a specific example, the time difference setting device 200 can be implemented as one function of a computer for an administrator who monitors states of a plurality of laser processing systems. When the time difference setting device 200 independent of the numerical control device 100A is provided in this way, existing equipment can be relatively easily modified into the laser processing system 1A capable of performing the laser processing with more accuracy.

The time difference setting device 200 includes a sub-storage unit 201, a second transfer unit 202, a program analysis unit 102, an interpolation unit 103, a laser command generation unit 104, a laser output calculation unit 106, a laser delay time calculation unit 107, a positioning command generation unit 108, a speed change acquisition unit 110, a mechanism delay time calculation unit 111, and a command time difference setting unit 112. The program analysis unit 102, the interpolation unit 103, the laser command generation unit 104, the laser output calculation unit 106, the laser delay time calculation unit 107, the positioning command generation unit 108, the speed change acquisition unit 110, the mechanism delay time calculation unit 111, and the command time difference setting unit 112 of the time difference setting device 200 of the laser processing system 1A shown in FIG. 2 have the same configuration as the main storage unit 101, the program analysis unit 102, the interpolation unit 103, the laser command generation unit 104, the laser output calculation unit 106, the laser delay time calculation unit 107, the positioning command generation unit 108, the speed change acquisition unit 110, the mechanism delay time calculation unit 111, and the command time difference setting unit 112 of the laser processing system 1 shown in FIG. 1.

The sub-storage unit 201 stores the machining program received from the numerical control device 100A and the command time difference calculated by the command time difference setting unit 112.

The second transfer unit 202 causes the sub-storage unit 201 to store information transmitted from the numerical control device 100A, and transmits the command time difference stored in the sub-storage unit 201 to the numerical control device 100A.

In the laser processing system 1A in FIG. 2, the components for setting the command time difference in the laser processing system 1 in FIG. 1 are provided as independent devices, and the first transfer unit 122, the sub-storage unit 201, and the second transfer unit 202 are added for division of devices. Therefore, even in the laser processing system 1A in FIG. 2, ideal laser processing can be performed by setting the command time difference such that the machining program can be reproduced accurately.

Although the embodiment of the present disclosure has been described above, the present invention is not limited to the above-described embodiment. Moreover, the effects described in the above-described embodiment are merely enumerations of the most suitable effects arising from the present invention, and the effects of the present invention are not limited to those described in the above-described embodiment.

EXPLANATION OF REFERENCE NUMERALS 1, 1A: laser processing system
10: laser oscillator
20: laser head
30: driving mechanism
100, 100A: numerical control device
101: main storage unit
102: program analysis unit
103: interpolation unit
104: laser command generation unit
105: laser command switching unit
106: laser output calculation unit
107: laser delay time calculation unit
108: positioning command generation unit
109: positioning command switching unit
110: speed change acquisition unit
111: mechanism delay time calculation unit
112: command time difference setting unit
121: control unit
122: first transfer unit
200: time difference setting device
201: sub-storage unit
202: second transfer unit

The invention claimed is:

1. A time difference setting device in a laser processing system including a laser oscillator that generates a laser beam, a laser head that emits the laser beam, a driving mechanism that determines a relative position of the laser head and a workpiece, and a numerical control device that generates, based on a machining program, a laser command for the laser oscillator and a positioning command for the driving mechanism, the time difference setting device being configured to set a command time difference which is a time difference in output timing of the laser command with respect to the positioning command, the time difference setting device comprising a memory and a processor, wherein the memory stores instructions configured to cause the processor to:
   acquire a change in speed of the driving mechanism with respect to the positioning command that is based on the machining program;
   calculate, based on the change in speed of the driving mechanism, a mechanism delay time which is a delay time in positioning by the driving mechanism with respect to the positioning command;
   calculate a change in output of the laser oscillator with respect to the laser command that is based on the machining program, using an oscillator model for simulating an operation of the laser oscillator;
   calculate, based on the change in output of the laser oscillator, a laser delay time which is a delay time in output of the laser oscillator with respect to the laser command; and
   set the command time difference for a section in which an emission of the laser beam is designated in the machining program, based on the mechanism delay time and the laser delay time.

2. The time difference setting device according to claim 1, wherein the processor is configured to calculate the change in speed of the driving mechanism with respect to the positioning command, using a mechanism model for simulating an operation of the driving mechanism.

3. The time difference setting device according to claim 1, wherein the processor is configured to calculate the mechanism delay time only for a moment when a speed according to the positioning command becomes constant.

4. A numerical control device in a laser processing system including a laser oscillator that generates a laser beam, a laser head that emits the laser beam, and a driving mechanism that determines a relative position of the laser head and a workpiece, the numerical control device being configured to generate, based on a machining program, a laser command for the laser oscillator and a positioning command for the driving mechanism, the numerical control device comprising a memory and a processor, wherein the memory stores instructions configured to cause the processor to:

acquire a change in speed of the driving mechanism with respect to the positioning command that is based on the machining program;

calculate, based on the change in speed of the driving mechanism, a mechanism delay time which is a delay time in positioning by the driving mechanism with respect to the positioning command;

calculate a change in output of the laser oscillator with respect to the laser command that is based on the machining program, using an oscillator model for simulating an operation of the laser oscillator;

calculate, based on the change in output of the laser oscillator, a laser delay time which is a delay time in output of the laser oscillator with respect to the laser command; and set a command time difference which is a time difference in output timing of the laser command with respect to the positioning command, for a section in which an emission of the laser beam is designated in the machining program, based on the mechanism delay time and the laser delay time.

\* \* \* \* \*